April 13, 1937.   R. W. McLEAN   2,077,247
COTTONSEED HULLER
Filed Jan. 14, 1935
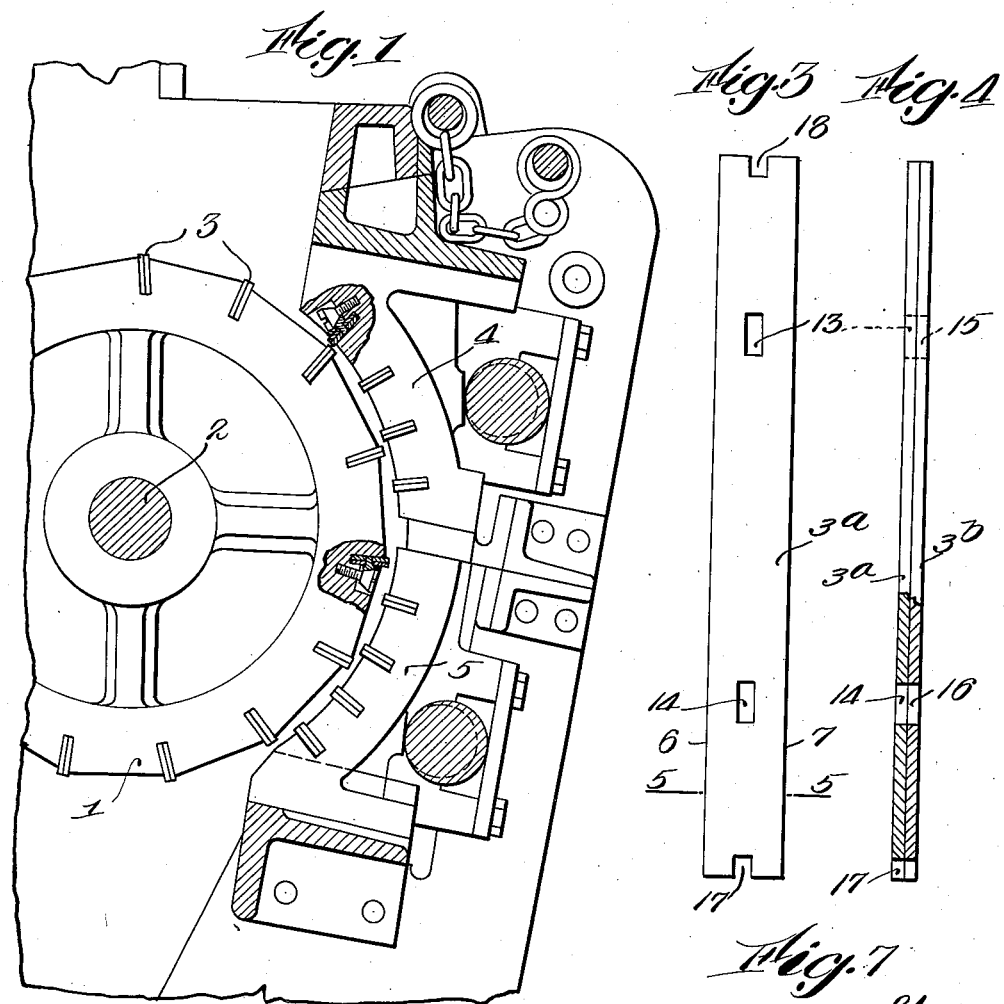
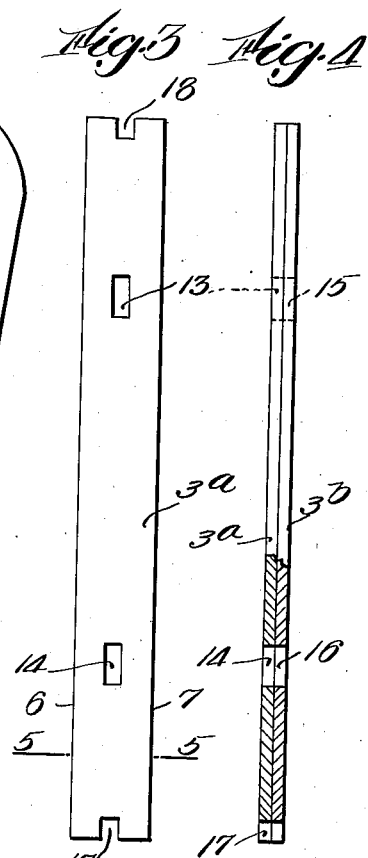
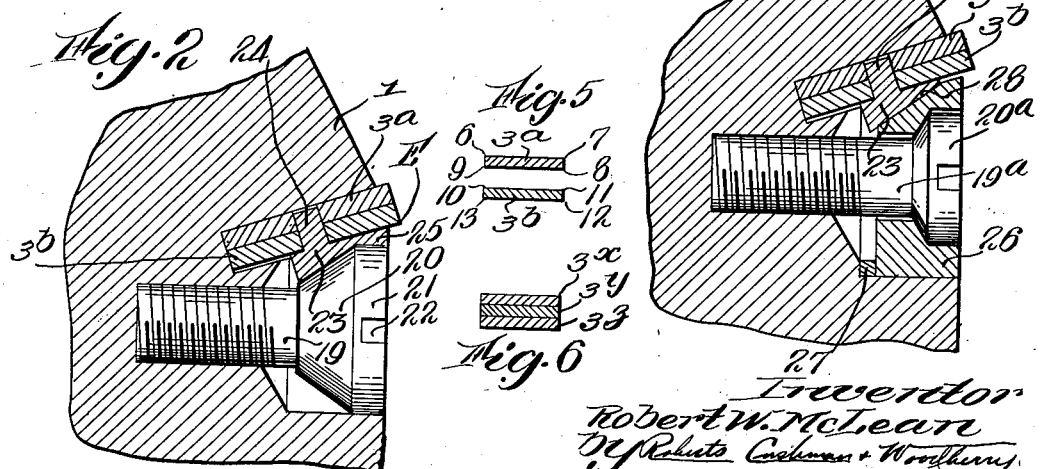
Inventor
Robert W. McLean Patented Apr. 13, 1937

2,077,247

UNITED STATES PATENT OFFICE 2,077,247

COTTONSEED HULLER

Robert W. McLean, Bridgewater, Mass., assignor to Carver Cotton Gin Company, East Bridgewater, Mass., a corporation of Massachusetts Application January 14, 1935, Serial No. 1,706

3 Claims. (Cl. 83—14)

This invention relates to cutters or like devices and more particularly to cutters for use in power driven machines running at high speed and in which the cutters are subjected to hard and often abusive treatment necessitating their frequent replacement. While the improved cutter forming the immediate subject matter of the present invention is of broader utility, I have herein chosen to illustrate and describe it as embodied in a cotton seed huller wherein its peculiar characteristics are highly advantageous.

A cotton seed huller usually consists of a rotary drum or cylinder-carrying cutters spaced circumferentially about its periphery, which are adapted to cooperate with similar cutters mounted in one or more "concave" members arranged adjacent to the drum as shown, for example, in the patent to McLean, No. 1,590,305 issued June 29, 1926,—the seeds to be cracked or hulled being fed between the drum or cylinder and the normally stationary concave members and subjected to the cracking or cutting action of the two sets of cutters.

Machines of this character, and particularly the cutting elements thereof, are frequently subjected to heavy shocks and severe usage, and in consequence, the cutters are quickly dulled. When the cutters become dull, that is to say, when their cutting edges become more or less rounded, they engage the cotton seeds with a crushing, rather than a cutting or cracking action, and, as a result, a large percentage of the oil contained in the kernel or meat of the seed is expressed and absorbed in the hulls. Thus for efficient operation it is essential to keep the edges of the cutters sharp.

As commonly constructed, the cylinder and concave are provided with cutter-receiving slots adapted to receive flat blades approximately $\frac{5}{16}$ of an inch in thickness, such blades usually being cast or forged and thereafter subjected to suitable hardening and sharpening treatments. Blades thus constructed are relatively expensive to make and as they are not ordinarily of uniform granular structure throughout, repeated grindings and sharpening may reduce them to a condition such that they will not retain their edge for any substantial time. Usually these blades are of substantially rectangular cross section so that when new or freshly ground, each blade has four sharp edges, which, by properly disposing the blade in its slot, may be placed successively in operative position. In accordance with one arrangement, as disclosed for example in the patent to McLean, No. 1,964,786, dated July 3, 1934, the blade is held within the slot by means of screws having heads of a special shape comprising peripheral ribs which engage complemental depressions in the faces of the cutters. In the McLean patent, No. 1,790,106, dated January 27, 1931, various constructions are described whereby a very thin blade of sheet material may be held within a blade-holding slot of normal width, but in none of the previous arrangements known to me does the cutter within a given slot provide more than four available cutting edges.

In accordance with the present invention I obtain certain of the advantages set forth in the McLean Patent No. 1,790,106, as respects the use of a blade of relatively thin material (for example, approximately one-half the thickness of the usual cutter) such as may readily be produced by cutting and punching operations, and in addition secure other advantages, for example, the advantage of providing each slot with a cutter having eight or more cutting edges.

After considerable experiment I have discovered that acceptable cutters for this purpose may be made from "cold rolled" steel, as contrasted with the previous usual methods of making cutters from forged material or from castings. Cold rolled steel possesses many advantages for this purpose, among them being its availability in sheets of accurately uniform thickness having smoothly polished parallel surfaces, and in particular possessing a substantially uniform and homogeneous grain structure such that no matter how often the cutter may be ground, the character of the cutting edge will remain the same. Cutters made from this material may readily be produced by cutting and punching operations and require no subsequent heat treatment to make them available and proper for use. By assembling a plurality of thin blades of this material so as to form a composite cutter of a thickness corresponding to the thickness of the usual normal commercial single blade, it is thus possible to make a cutter of adequate strength and stiffness, and which as above noted, furnishes more than four cutting edges available for use, the material throughout the entire cutter being of uniform character, dense, compact and well suited to perform the operation for which it is intended.

Further, in accordance with the present invention, provision is made not only for holding the cutter securely in its slot against radial movement, but the cutter is also adequately supported at points adjacent to its active cutting edge so that vibration and chattering of the cutter is eliminated. These advantageous features are attained in a simple and inexpensive manner and the improved cutter may be installed in existing machines without changes in the latter, while the operation of removing, reversing and reinstalling the constituent blades of a given cutter may be quickly performed without requiring skilled labor.

In the accompanying drawing, wherein certain desirable embodiments of the invention are illustrated by way of example, Fig. 1 is a vertical sectional view of a cotton seed huller showing portions of the cylinder and portions of the concave in elevation;

Fig. 2 is a vertical sectional detail, to larger scale, showing one desirable means of securing the improved cutter in one of the slots of the cylinder;

Fig. 3 is a plan view of the improved composite cutting device;

Fig. 4 is an edge view partly in longitudinal section illustrating a duplex cutter;

Fig. 5 is a section substantially on the line 5—5 of Fig. 3 showing the component blades of the cutter slightly separated;

Fig. 6 is a section transversely through the composite cutter, but illustrating a cutter comprising three blades; and Fig. 7 is a view similar to Fig. 2 but illustrating a modified arrangement for clamping the cutter in its slot.

Referring to Fig. 1 of the drawing, the numeral 1 designates a cylinder or drum mounted on a shaft 2 and having substantially radial slots for the reception of the improved cutters 3. The hulling machine also comprises the concave, comprising the parts 4 and 5 which are substantially concentric with the cylinder or drum 1 and which are individually pivoted, so as on occasion to swing away from the cylinder, as more fully disclosed in the patent to McLean, No. 1,590,305, dated June 29, 1926. The peripheral surface of the concave is furnished with substantially radial slots for the reception of cutters, such as the cutter 3, the slots in both cylinder and concave being of a width, if desired, such as to hold the usual thick and rigid forged or cast cutters which are usually employed and for which existing machines are designed. One side wall of each cutter-receiving slot constitutes an abutment element against which the cutter is firmly held, as hereafter more fully described. Inasmuch as the machine as a whole, together with its mode of operation, is described in the last mentioned patent to McLean, and as the general construction of the machine enters into this invention only as furnishing an appropriate environment for the use of the cutters forming the essential subject matter of this invention, no further detailed description of the machine is here given.

As illustrated in Figs. 4 and 5, my improved cutter comprises a pair of blades 3$^a$ and 3$^b$ respectively, although a greater number of blades may be used, each of these blades being of substantially the same shape and dimensions and adapted to be registered with one another so as to form the composite cutter 3. These blades are preferably made from cold rolled steel, of appropriate gauge (for example, $\frac{5}{32}$ inch thick), by a cutting and/or punching operation, such steel being of uniform and homogeneous character, being dense and hard and of a fine granular structure. The blades are substantially flat and preferably of substantially rectangular cross section, the blade 3$^a$ having the longitudinal cutting edges 6, 7, 8 and 9 (Fig. 5) and the blade 3$^b$ having the longitudinal cutting edges 10, 11, 12 and 13. Each of these cutting edges is preferably formed by the intersection of two surfaces at right angles to each other, the narrow faces of the blades being accurately ground so that the cutting edges are substantially rectilinear.

Preferably each blade is provided with one or more apertures 13, 14 which are desirably of angular contour, for example, rectangular, and are preferably disposed along the longitudinal center of the blade, although they may be located at other positions if desired. The apertures in the several blades are so arranged that when the flat blades are assembled to form the composite cutter, the apertures are also in registry, so as to form openings extending throughout the entire thickness of the cutter. If desired, each blade may be provided with a notch or recess 17, 18 at its opposite ends, respectively, for the reception of a suitable tool, whereby the cutter may be lifted out of the slot when it is desired to do so.

The cylinder 1 and the concave, comprising the parts 4 and 5, may hereinafter be designated for purposes of convenience as cutter "holders", and as already noted the slots in these holders are preferably of substantially rectangular cross section and of such dimensions as to form sockets within which the composite cutters seat, preferably with an easy sliding fit.

As is common in machines of this type, each holder is provided with two or more recesses adjacent to each of its slots and opening into each slot at the side opposite to the abutment wall of the slot, and in each of such recesses there is arranged a clamping screw 19. As illustrated in Fig. 2 the clamping screw 19 is furnished with a head having a substantially conical surface 20 and a substantially cylindrical surface 21, the head being provided with a transverse slot 22 for the reception of a screw driver or equivalent tool.

For retaining the composite cutter in position within the slot I provide a cutter-retaining member 23 having an arm or lug 24 which fits into the opening in the cutter and which is preferably of substantially the same cross-sectional shape as the opening. This arm extends through the apertures in both blades of the composite cutter and the body portion 23 of this retaining member is furnished with a conically curved or beveled face adapted to fit against the conical surface 23 of the clamping screw head. Preferably, the retaining member has an extension 25 which is disposed between the cylindrical part 21 of the screw head and the outer part of the cutter blade 3$^b$, the latter blade being the one whose edge E is the active cutting edge for the time being. By providing the part 25, disposed between the screw head and the outer part of the blade adjacent to the cutting edge of the latter, the blade is very rigidly held in position so that it does not tend to vibrate or chatter during use. By retracting the clamping screw 19 the composite cutter and the retaining member 23 may be removed, and the blades of the cutter rearranged so as to provide a fresh cutting edge, whereupon the cutter is reinserted in its slot with the arm 24 of the retaining member extending into the opening through the cutter and the screw 19 is tightened thereby firmly clamping the cutter in operative position.

In Fig. 7 an alternative arrangement is illustrated for use with a clamping screw 19a of a different type, such screw being unprovided with a steep conical surface such as that of the screw 19, but having the head 20a. In this view the cutter, comprising the blades 3a and 3b, is the same as that above described and the retaining member 23, having the cutter-engaging arm 24, may be substantially like that shown in Fig. 2. However, in this arrangement, as the screw is not provided with a steep conical surface adapted to engage the beveled face of the retaining member, I provide a bridge piece 26 having a beveled surface 28 at one end which rests against the beveled surface of the retaining member 23 and which, at its other end, rests upon a spacer block 27 disposed in the bottom of the screw-receiving recess in the holder. While this arrangement involves the employment of additional parts, it makes it possible to use my improved composite cutter and cutter-retaining member in existing machines provided with clamping screws of a type shown in Fig. 7.

While the composite cutter may comprise but two parts, as shown in Figs. 4 and 5, I may employ a greater number of blades to form the composite cutter, for example, as shown in Fig. 6 wherein the cutter comprises the blades 3x, 3y and 3z, all of the same size and disposed in registering relation. Obviously a greater number of blades may be employed, the individual blades being of such thickness that, when assembled, a cutter of the desired aggregate thickness will result.

While I have herein described certain desirable embodiments of the invention by way of example, I wish it to be understood that the invention is not necessarily limited thereto, but that equivalent means may be substituted for the elements and combinations herein specifically disclosed by way of example.

I claim:

1. In a machine of the class described having a holder provided with a cutter-receiving slot and a recess which opens laterally into one side of the slot, a cutter-retaining member having a body portion which is disposed in the recess and a cutter-engaging part which projects into the slot, the body portion having a beveled face exposed within the recess, a clamping screw having a threaded stem engaging a threaded bore extending inwardly into the substance of the holder from the bottom of the recess, said screw having a head of larger diameter than the stem, a bridge member disposed within the recess and beneath the head of the screw, that part of the bridge member which is nearest to the slot being inclined and normally engaging the beveled face of the retaining member, the under side of the bridge member being spaced from the bottom of the recess, and a fulcrum member resting on the bottom of the recess and constructed and arranged to support that part of the bridge member which is most remote from the slot, the bridge member rocking about said support as a fulcrum in response to force exerted by the screw head.

2. In combination in a machine of the class described including a holder having a cylindrically curved outer surface provided with a longitudinally extending cutter-receiving slot normally of substantially rectangular transverse section, and also having a recess in said cylindrically curved surface which opens laterally into one side of the slot, a cutter of substantially rectangular transverse section seated in the slot, said cutter having a substantially rectangular opening extending completely through it, a cutter-retaining member disposed in the recess, said retaining member having a lug which extends laterally into and substantially through the opening in the cutter, the peripheral surfaces of the lug being substantially perpendicular to the face of the cutter, the retaining member having a beveled face exposed within the recess, said face diverging inwardly, with reference to the cylindrically curved surface of the holder, away from the adjacent face of the cutter, and clamping means including a screw which engages a threaded bore extending inwardly into the substance of the holder from the bottom of the recess, said clamping means including a part having an inclined surface which engages the beveled face of the retaining member, said part being movable toward and from the bottom of the recess but being always spaced from the bottom of the latter, the inclined face of said part cooperating with the beveled face of the cutter-retaining member to exert a wedging action operative to wedge the cutter concomitantly toward the bottom and opposite side wall respectively of the slot.

3. In combination in a machine of the class described including a holder having a cylindrically curved outer surface provided with a longitudinally extending cutter-receiving slot normally of substantially rectangular transverse section, and also having a recess in said cylindrically curved surface which opens laterally into one side of the slot, the slot being of a transverse width sufficient to accommodate a cutter comprising two or more like blades each of substantially rectangular transverse section, a cutter comprising a plurality of like blades, each of substantially rectangular transverse section, seated in the slot, the several blades having registering openings extending through them, a cutter-retaining member disposed in the recess, said retaining member having a lug long enough to enter the registering openings in the several blades and to extend substantially through the entire blade assembly, the peripheral surfaces of said lug being substantially perpendicular to the face of the cutter, the retaining member having a beveled face exposed within the recess, and clamping means including a screw-threaded element which engages a threaded bore extending inwardly into the substance of the holder from the bottom of the recess, said clamping means also including a part having an inclined face which engages the beveled face of the retaining member, said part being movable toward and from the bottom of the recess but being always spaced from the bottom of the latter, said part, in cooperation with the retaining member, exerting a wedging action operative to urge the several blades concomitantly toward the bottom and opposite side wall respectively of the slot.

ROBERT W. McLEAN.